(12) United States Patent
Sutter et al.

(10) Patent No.: US 6,964,689 B2
(45) Date of Patent: Nov. 15, 2005

(54) ANTHRAQUINONE DYES, PREPARATION THEREOF AND USE THEREOF

(75) Inventors: Peter Sutter, Muttenz (CH); Peter Aeschlimann, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/451,173

(22) PCT Filed: Dec. 13, 2001

(86) PCT No.: PCT/EP01/14692

§ 371 (c)(1),
(2), (4) Date: Jun. 20, 2003

(87) PCT Pub. No.: WO02/051941

PCT Pub. Date: Jul. 4, 2002

(65) Prior Publication Data

US 2004/0040099 A1 Mar. 4, 2004

(30) Foreign Application Priority Data

Dec. 22, 2000 (CH) .............................. 2508/00
Feb. 13, 2001 (CH) .............................. 0247/01

(51) Int. Cl.$^7$ ............................. D06P 1/16; C09B 67/22
(52) U.S. Cl. .................. 8/643; 8/506; 8/678; 8/922
(58) Field of Search ............................. 552/235; 8/506, 8/643, 678, 922

(56) References Cited

U.S. PATENT DOCUMENTS 4,176,113 A * 11/1979 Wick et al. ................. 524/217

FOREIGN PATENT DOCUMENTS

| CH | 369741 |   | * 2/1963 |
| CH | 369741 |   |   7/1963 |
| DE | 3314467 | * | 1/1984 |
| FR | 2369314 | * | 5/1978 |
| GB | 905449  | * | 9/1962 |

* cited by examiner

Primary Examiner—Margaret Einsmann
(74) Attorney, Agent, or Firm—Kevin T. Mansfield

(57) ABSTRACT

The present invention relates to anthraquinone dyes of the formula (I) where $R_1$ is hydrogen, $R_2$ is hydrogen or CO—$C_2C_6$alkyl moiety may be substituted by carboxyl, or is (II) wherein $R_6$ is hydrogen, $C_1$–$C_4$alkyl, hydroxyl, carboxyl or halogen, $R_7$ is hygrogen, $C_1$–$C_4$alkyl or halogen and $R_8$ is hydrogen or $C_2$–$C_3$alkyl or when $R_4$ is halogen R¿8? may be methyl or halogen $R_3$ is hydrogen or halogen, $R_4$ is hydrogen or halogen and n is (0), (1) or (2), with the proviso that $R_3$, $R_4$, $R_6$, $R_7$ and $R_8$ are not all hydrogen at one and the same time, processes for their preparation and their use for dyeing or printing hydrophobic fiber materials or for preparing colored plastics or polymeric color particles.

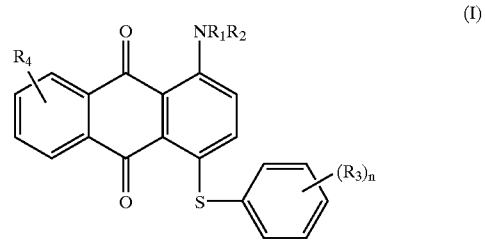

(I)

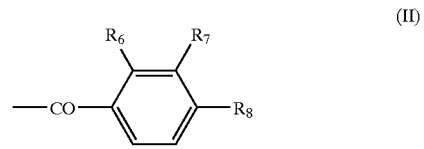

(II)

6 Claims, No Drawings

ANTHRAQUINONE DYES, PREPARATION THEREOF AND USE THEREOF

The present invention relates to anthraquinone dyes, their preparation and their use for dyeing or printing manufactured natural polymer or synthetic hydrophobic fibre materials and for preparing coloured plastics or polymeric colour particles.

Anthraquinone dyes and their use for dyeing manufactured natural polymer or synthetic hydrophobic fibre materials are known. Also known is the use of anthraquinone dyes for mass colouring synthetic materials (plastics). However, it has been determined that these dyes do not always fully meet the highest requirements, especially with regard to hot light fastness, heat stability and/or colour strength. There is accordingly a need for novel dyes which produce hot light fast, heat stable and strong dyeings or prints and have good general fastnesses.

It has now been found that, surprisingly, the dyes of the invention substantially meet the criteria indicated above.

The present invention accordingly provides anthraquinone dyes of the formula

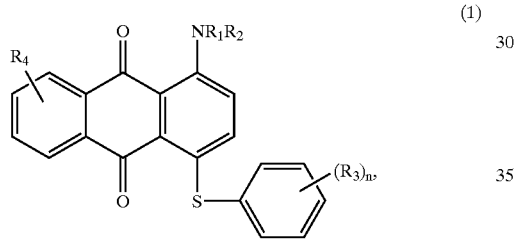

(1)

where
$R_1$ is hydrogen,
$R_2$ is hydrogen or —CO—$C_2$–$C_6$alkyl wherein the $C_2$–$C_6$alkyl moiety may be substituted by carboxyl, or is

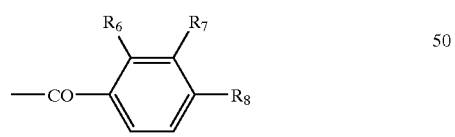

wherein $R_6$ is hydrogen, $C_1$–$C_4$alkyl, hydroxyl, carboxyl or halogen, $R_7$ is hydrogen, $C_1$–$C_4$alkyl or halogen and $R_8$ is hydrogen or
$C_2$–$C_3$alkyl or when $R_4$ is halogen $R_8$ may be methyl or halogen,
$R_3$ is hydrogen or halogen,
$R_4$ is hydrogen or halogen and
n is 0, 1 or 2,
with the proviso that $R_3$, $R_4$, $R_6$, $R_7$ and $R_8$ are not all hydrogen at one and the same time.

Preferred dyes of the formula (1) are dyes of the formulae

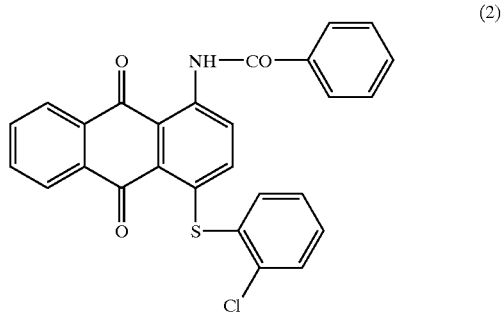

(2)

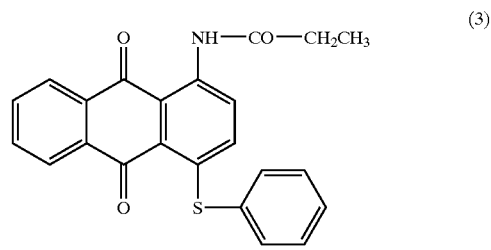

(3)

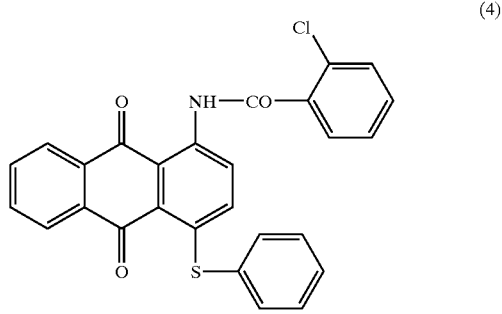

(4)

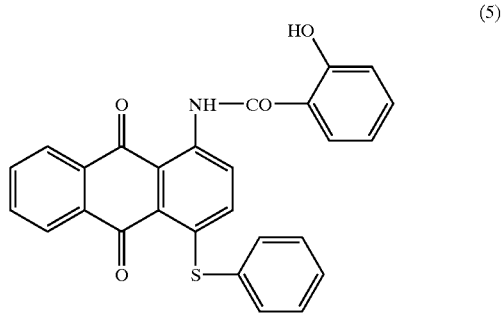

(5)

(6)
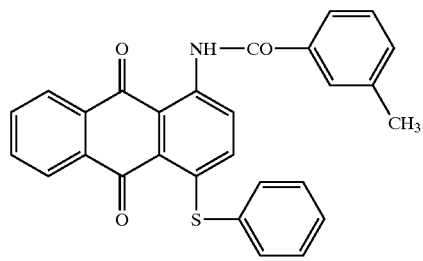

(7)
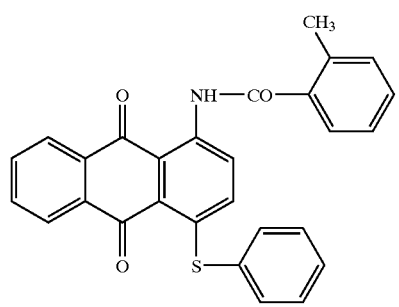

(8)
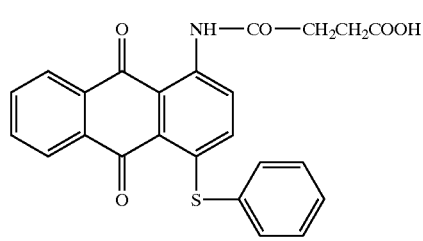

(9)
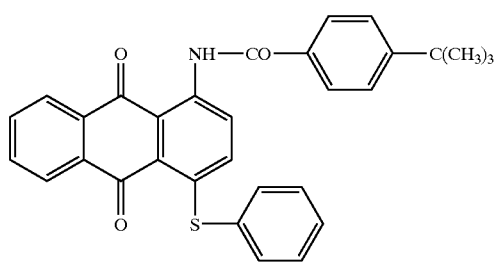

(10)
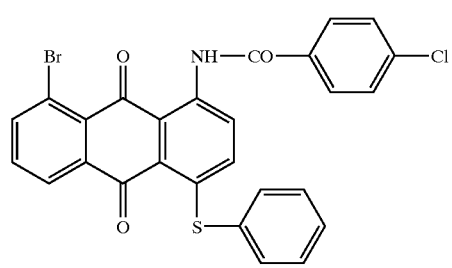

(11)
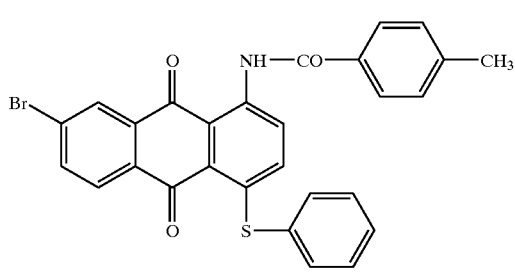

(12)

(13)

and (14)

The present invention further provides a process for preparing the anthraquinone dyes of the formula (1) according to the invention.

The anthraquinone dyes according to the invention are obtainable similarly to known compounds, for example by reacting a compound of the formula

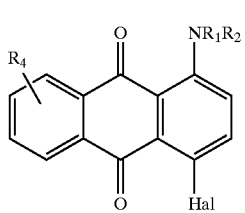
(50)

where
$R_1$, $R_2$ and $R_4$ are each as defined under the formula (1) and Hal is halogen, preferably chlorine, with a compound of the formula

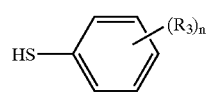
(51)

where
R₃ and n are each as defined under the formula (1), or by reacting a compound of the formula

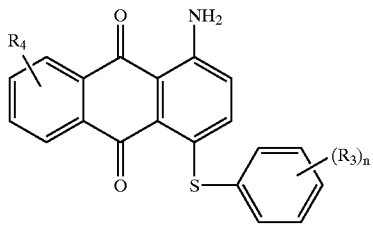
(52)

where
R₃, R₄ and n are each as defined under the formula (1), with the compound of the formula

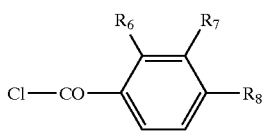
(53)

where
R₆, R₇ and R₈ are each as defined under the formula (1), according to known processes.

The compounds of the formulae (50) to (53) are known or preparable according to generally known methods.

The present invention further provides a dye mixture comprising two or more structurally different anthraquinone dyes of the formula (1).

Preference is given to a dye mixture comprising two structurally different anthraxquinone dyes of the formula (1).

Particular preference is given to a dye mixture comprising the anthraquinone dyes of the formulae (4) and (13) and the dye of the formula

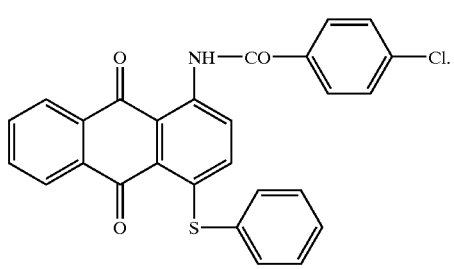
(15)

The dye of the formula (15) is known and preparable according to generally known methods.

The amount of the individual dyes in the dye mixtures according to the invention can vary within wide limits, for example from 95:5 to 5:95 parts by weight, especially from 70:30 to 30:70 parts by weight and particularly from 55:45 to 45:55 parts by weight of the individual dyes in a dye mixture comprising two anthraquinone dyes of the formula (1) according to the invention.

Important dye mixtures comprise 30 to 40 percent by weight of the anthraquinone dye of the formula (4), 30 to 40 percent by weight of the anthraquinone dye of the formula (13) and 30 to 40 percent by weight of the anthraquinone dye of the formula (15), based on 100 percent by weight of the dye mixture.

Particularly important dye mixtures comprise the anthraquinone dyes of the formulae (4), (13) and (15) in a weight ratio of 1:1:1.

The dye mixtures comprising two or more structurally different anthraquinone dyes of the formula (1) may be prepared by, for example, simply mixing two or more of the above-described anthraquinone dyes, for example anthraquinone dyes of the formulae (4) and (13) or (4), (13) and (15).

The dyes or dye mixtures of the invention are useful for dyeing and printing manufactured natural polymer and especially synthetic hydrophobic fibre materials, especially textile materials. Textile materials composed of blend fabrics comprising such manufactured natural polymer or synthetic hydrophobic textile materials are likewise dyeable or printable with the dyes or dye mixtures of the invention.

Useful manufactured natural polymer textile materials are especially cellulose acetate and cellulose triacetate.

Synthetic hydrophobic textile materials are especially linear aromatic polyesters, for example polyesters formed from a terephthalic acid and glycols, particularly ethylene glycol, or condensation products of terephthalic acid and 1,4-bis(hydroxymethyl)cyclohexane; polycarbonates, for example those formed from α,α-dimethyl-4,4-dihydroxydiphenylmethane and phosgene; or fibres based on polyvinyl chloride or polyamide.

The dyes or dye mixtures of the invention are applied to the textile materials according to known dyeing processes. For example, polyester fibres are exhaust dyed from an aqueous dispersion in the presence of customary anionic or nonionic dispersants with or without customary carriers at temperatures between 80 and 140° C. Cellulose acetate is preferably dyed at between about 65 to 85° C. and cellulose triacetate at up to 115° C.

The dyes or dye mixtures of the invention dye adjacent wool and cotton only minimally, if at all, i.e., exhibit a very good wool and cotton reserve, so that they may also be used to good effect for dyeing polyester-wool and polyester-cellulosic blend fabrics.

The dyes or dye mixtures of the invention are useful for dyeing by the thermosol, exhaust and continuous processes and for printing processes. The exhaust process is preferred. The liquor ratio depends on the apparatus, the substrate and the make-up form. However, the liquor ratio can be chosen to be within a wide range, for example in the range from 4:1 to 100:1, but it preferably is between 6:1 to 25:1.

The textile material mentioned may be present in the various processing forms, for example as a fibre, yarn or web or as a woven or loop formingly knitted fabric.

It is advantageous to convert the dyes or dye mixtures of the invention into a dye preparation before use. For this, the dyes are ground so that their particle size is on average between 0.1 and 10 microns. The grinding may be effected in the presence of dispersants. For example, the dried dye is ground with a dispersant or kneaded in paste form with a dispersant and then dried under reduced pressure or by spray drying. The preparations thus obtained can be used to prepare print pastes and dye-baths by adding water.

Printing utilizes the customary thickeners, for example modified or nonmodified natural products, for example alginates, British gum, gum arabic, crystal gum, carob bean flour, tragacanth, carboxymethylcellulose, hydroxyethylcellulose, starch or synthetic products, for example polyacrylamides, polyacrylic acid or copolymers thereof or polyvinyl alcohols.

The dyes or dye mixtures of the invention confer on the materials mentioned, especially on polyester material, level shades having very good service fastnesses, such as in particular good light fastness, especially a very good hot light fastness, fastness to dry heat setting and pleating, chlorine fastness and wet fastness such as fastness to water, perspiration and washing; the dyeings are further characterized by good rub fastness and heat stability.

The dyes or dye mixtures of the invention are also very useful for preparing combination shades together with other dyes. More particularly, the dyes of the invention can be used as a suitable component in a trichromatic dyeing or printing technique.

The aforementioned use of the dyes or dye mixtures according to the invention forms as much a part of the subject-matter of the present invention as a process for dyeing or printing manufactured natural polymer or synthetic hydrophobic fibre material, especially textile material, which comprises applying the dyes or dye mixtures of the invention to the material mentioned or to incorporate them into it. The hydrophobic fibre material mentioned is preferably textile polyester material. Further substrates useful for treatment by the process of the invention and also preferred process conditions are to be found above under the more particular description of the use of the dyes or dye mixtures according to the invention.

The present invention further provides a process for preparing coloured plastics or polymeric colour particles, which is characterized in that it comprises blending a high molecular weight organic material and a colouristically effective amount of at least one anthraquinone dye of the formula (1) with each other.

The high molecular weight organic substances are coloured with the anthraquinone dye of the formula (1) by, for example, mixing such an anthraquinone dye into these substrates using roll mills or mixing or grinding apparatus whereby the anthraquinone dye is dissolved or finely dispersed in the high molecular weight material. The high molecular weight organic material with the admixed anthraquinone dye is then processed in a conventional manner, for example by calendering, pressing, extrusion, spread coating, spinning, casting or injection moulding, whereby the coloured material acquires its ultimate shape. The admixing of the anthraquinone dye can also be effected directly prior to the actual processing step, for example by continuously metering a pulverulent anthraquinone dye and a granulated or pulverulent high molecular weight organic material and also optionally additional substances such as for example additives simultaneously directly into the inlet zone of an extruder where the mixing-in takes place just prior to the processing. In general, however, prior mixing of the anthraquinone dye into the high molecular weight organic material is preferable, since more uniformly coloured substrates are obtainable.

It is frequently desired to incorporate plasticizers into the high molecular weight compounds prior to shaping to produce non-rigid mouldings or to reduce their brittleness. Examples of useful plasticizers are esters of phosphoric acid, phthalic acid or sebacic acid. In the process of the invention, plasticizers can be incorporated into the polymers before or after the colorant has been incorporated. It is further possible, for the purpose of achieving different hues, to add to the high molecular weight organic substances not only the anthraquinone dye of the formula (1) but also further anthraxquinone dyes or other colorants in any desired quantities, optionally together with further additives such as for example fillers or siccatives.

It is preferable to colour thermoplastic materials in the form of fibres especially. Preferred high molecular weight organic materials useful for coloration according to the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrile/butadiene/styrene (ABS). Particular preference is given to polyester and polyamide. Very particular preference is given to linear aromatic polyesters obtainable by polycondensation of terephthalic acid and glycols, especially ethylene glycol, or condensation products of terephthalic acid and 1,4-bis-(hydroxymethyl)cyclohexane, for example polyethylene terephthalate (PET) or polybutylene terephthalate (PBTP); polycarbonates, for example polycarbonates formed from α,α-dimethyl-4,4-dihydroxydiphenylmethane and phosgene; or polymers based on polyvinyl chloride or polyamide, for example nylon 6 or nylon 66.

The invention further provides the dyed or printed hydrophobic fibre material, preferably polyester textile material, and also the mass-coloured plastics provided by the aforementioned processes.

The dyes or dye mixtures of the invention are also useful for modern recording processes, for example thermal transfer printing.

The examples hereinbelow illustrate the invention. Parts and percentages are by weight, unless otherwise stated. Temperatures are in degrees Celsius. Parts by weight relate to parts by volume as the gram relates to the cubic centimetre.

PREPARATION EXAMPLE 1

13.3 parts by weight of 1-amino-4-thiophenylanthraquinone are suspended in 70 parts by weight of nitrobenzene. The resultant violet suspension is admixed with 8.2 parts by weight of 2-chlorobenzoyl chloride and heated to 150° C. Substantial evolution of gas commences at 90° C. The reaction mixture is maintained at 150° C. for 30 minutes and then cooled down to 70° C. At 70° C., 70 parts by weight of methanol are carefully added dropwise and the mixture is cooled down to 40° C. The suspension is then filtered off and washed with methanol and dried.

This provides 16.7 parts by weight of compound of formula

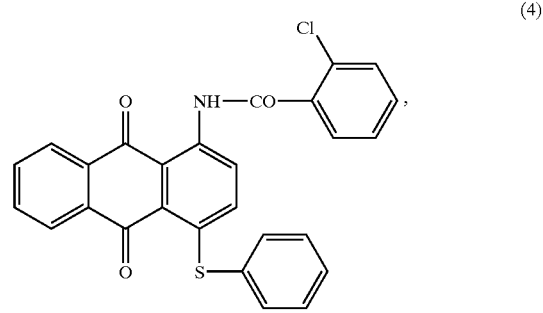

(4)

which dyes polyester in lightfast red shades.

PREPARATION EXAMPLE 2

Example 1 is repeated except that the 8.2 parts by weight of 2-chlorobenzoyl chloride are replaced by 8.2 parts by weight of 3-chlorobenzoyl chloride. This provides 16.7 parts by weight of the compound of the formula

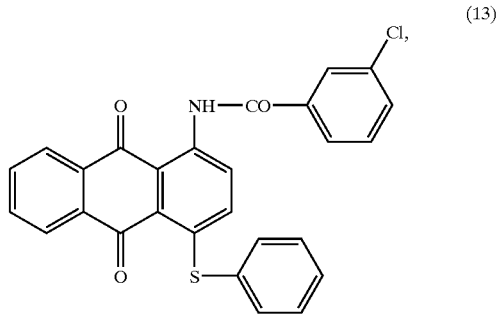

(13)

which likewise dyes polyester in lightfast red shades.

COLORATION EXAMPLE 1

1 g of the anthraquinone dye described in Preparation Example 1 is sand milled together with 17 g of water and 2 g of a commercially available dinaphthylmethanedisulfonate dispersant and converted into a 5% aqueous dispersion.

This formulation is used to prepare a 1% dyeing of on polyester at 130° C. in a high temperature exhaust process, followed by reduction clearing.

The red dyeing thus obtained comprises very good service fastnesses and especially an excellent light fastness.

COLORATION EXAMPLE 2

1200.00 g of polyester chips (PET Amite D04-300, DSM) are predried at 130° C. for 4 hours and subsequently mixed with
0.24 g of the pigment dye of the formula (4)
in a roller rack at 60 revolutions per minute for 15 minutes until homogeneous.

The homogeneous mixture is extruded on a twin screw 25 mm extruder (from Collin, D-85560 Ebersberg) comprising 6 heating zones at a maximum temperature of 275° C., quenched with water, granulated in a Turb Etuve TE 25 granulator (from MAPAG AG, CH-3001 Bern) and subsequently dried at 130° C. for 4 hours.

This provides red polyester chips having good allround fastnesses, especially very good light and hot light fastnesses.

COLORATION EXAMPLE 3

1200.00 g of polyester chips (PET Amite D04-300, DSM) are predried at 130° C. for 4 hours and subsequently mixed with
0.24 g of a dye mixture containing
0.08 g of the pigment dye of the formula (4),
0.08 g of the pigment dye of the formula (13) and
0.08 g of the pigment dye of the formula (15),
in a roller rack at 60 revolutions per minute for 15 minutes until homogeneous.

The homogeneous mixture is extruded on a twin screw 25 mm extruder from (Collin, D-85560 Ebersberg) comprising 6 heating zones at a maximum temperature of 275° C., quenched with water, granulated in a Turb Etuve TE 25 granulator (from MAPAG AG, CH-3001 Bern) and subsequently dried at 130° C. for 4 hours. This provides red polyester chips having good allround fastnesses, especially very good light and hot light fastnesses.

What is claimed is:

1. A dye mixture, which comprises the anthraquinone dyes of the formulae

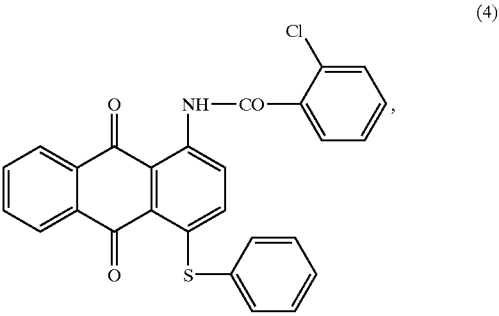

(4)

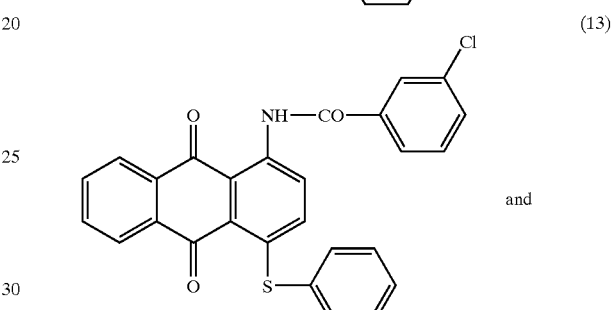

(13)

and

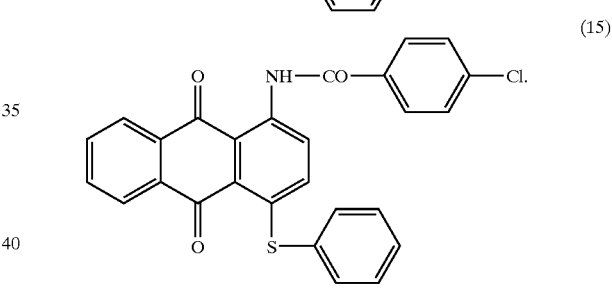

(15)

2. A dye mixture according to claim 1, which comprises 30 to 40 percent by weight of the anthraquinone dye of the formula (4), 30 to 40 percent by weight of the anthraquinone dye of the formula (13) and 30 to 40 percent by weight of the anthraquinone dye of the formula (15), based on 100 percent by weight of the dye mixture.

3. A process for preparing coloured plastics or polymeric colour particles, which comprises incorporating a dye mixture according to claim 1 into said materials.

4. A process for dyeing or printing manufactured natural polymer or synthetic hydrophobic fibre materials, which comprises contacting said materials with a tinctorially effective amount of a dye mixture according to claim 1.

5. Manufactured natural polymer or synthetic hydrophobic fibre materials dyed or printed with a dye mixture according to claim 1.

6. Plastics or polymeric colour particles coloured with a dye mixture according to claim 1.

* * * * *